United States Patent

[11] 3,583,711

| | | |
|---|---|---|
| [72] | Inventor | Donald E. Engleman<br>Louisville, Ky. |
| [21] | Appl. No. | 785,427 |
| [22] | Filed | Oct. 25, 1968<br>Division of Ser. No. 589,427, Oct. 25, 1966, Pat. No. 3,438,117 |
| [45] | Patented | June 8, 1971 |
| [73] | Assignee | American Air Filter Company, Inc.<br>Louisville, Ky. |

[54] COLLAPSIBLE SEALING GASKET
3 Claims, 6 Drawing Figs.

[52] U.S. Cl. .................................................... 277/199
[51] Int. Cl. ..................................................... F16j 15/00

[50] Field of Search ........................................ 277/199, 201, 220—222, 237

[56] References Cited
UNITED STATES PATENTS
3,231,289  1/1966  Carrell ......................... 277/222X
3,245,693  4/1966  Way ............................. 277/222

Primary Examiner—Laverne D. Geiger
Assistant Examiner—Robert I. Smith
Attorneys—Ralph B. Brick and Edward M. Steutermann ABSTRACT: A planar gasket is provided which has slits extending through a portion of the thickness thereof. The slits are strategically located around the gasket and enable the gasket to be collapsed.

PATENTED JUN 8 1971
3,583,711
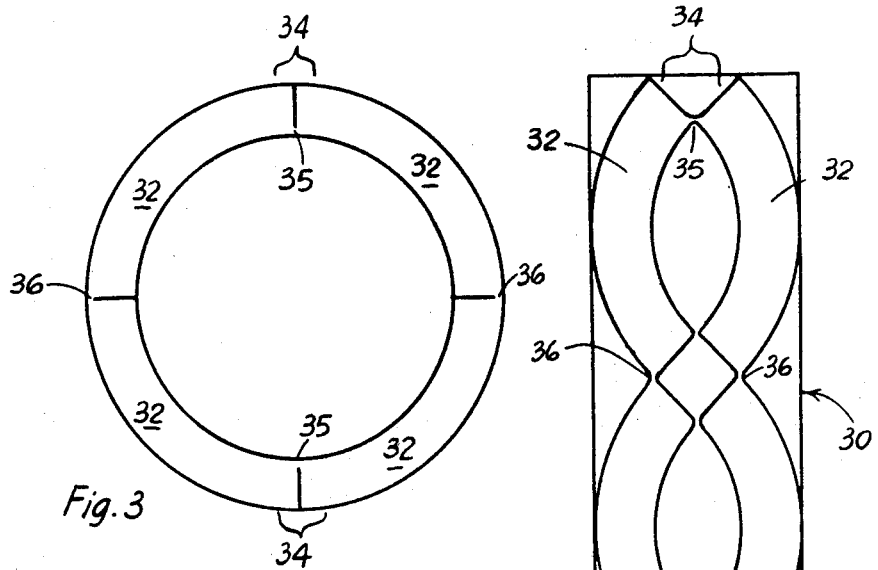
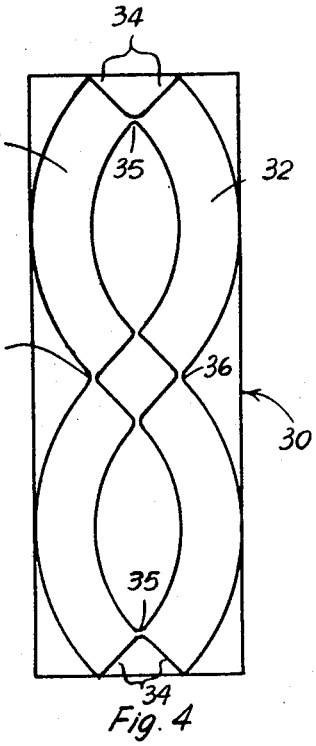
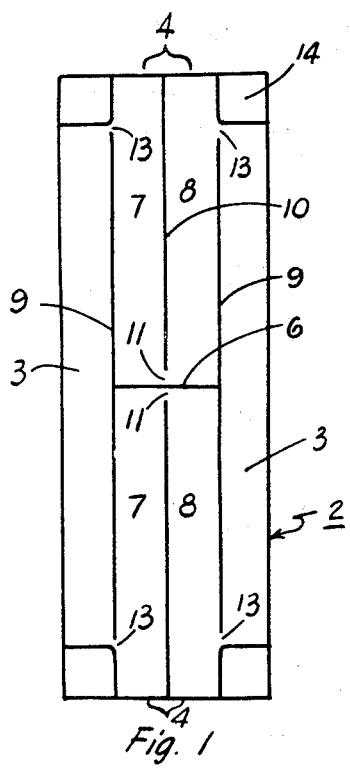
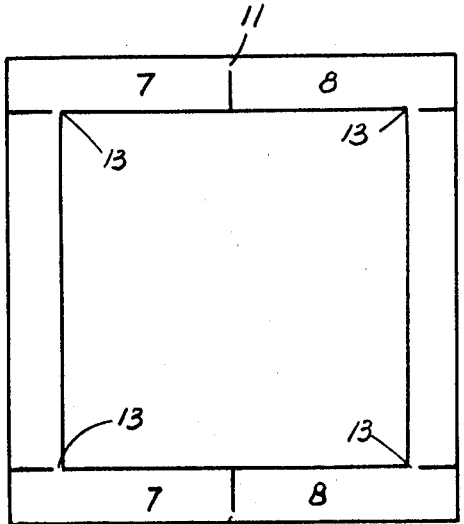
INVENTOR
Donald E. Engleman
BY
Ralph C. Brick

COLLAPSIBLE SEALING GASKET

The present invention which is a division of application Ser. No. 589,427, filed Oct. 25, 1966, now U.S. Pat. No. 3,438,117 relates to sealing gaskets and more particularly to a novel construction for an endless flow-through sealing gasket and method for making the same.

Numerous arrangements and methods of making sealing gaskets of an endless flow-through type are known in the art. By and large, these past arrangements and methods of making the same have required many parts and steps in manufacturing operations and have utilized substantial quantities of material with substantial concomitant waste. Further, the resulting gaskets produced by past manufacturing processes have not always adequately satisfied sealing conditions which they were designed to meet because of frequent fluid leakage and rupture occurrences.

In accordance with the present invention, a straight forward, economical and efficient sealing gasket is provided which can be readily formed in various geometric configurations and sizes by the method of the present invention with a minimum of steps and with a minimum utilization of materials. Further, the present invention provides a sealing gasket which affords continuous envelopment of the member being sealed to avoid further leakages and rupture. Moreover, the sealing gasket of the present invention can be stored and shipped in compact form and easily arranged for installation when required. Although the gasket of the present invention finds particular utility as a fluid sealant in high efficiency particulate filters, it is to be understood that the method and apparatus disclosed herein can be employed with gaskets destined for use in other arts.

Various other features of the present invention will become obvious to one skilled in the art upon reading the disclosure set forth hereinafter.

More particularly, the present invention provides a method of making an endless sealing gasket of preselected geometric contour from a sheet of gasket material comprising the steps of forming longitudinally extending sections of a contour conforming with the final preselected geometric contour of the gasket in the sheet of gasket material, with the sections being in compact adjacent relationship and with each longitudinally extending section being integrally joined to an adjacent longitudinally extending section through a corner on the extremity of one section attached at a preselected position on the other section with the remainder of such one extremity being free; removing the formed connected sections from the remainder of the blank; and pivotally expanding the connected sections about the joined corners so that the free extremities of the sections are brought into substantially full abutting engagement with adjacent longitudinal sections to which they are connected to form the endless sealing gasket of preselected geometric contour. Further, the present invention provides an endless sealing gasket of preselected geometric contour comprising a plurality of longitudinally extending sections disposed in end-to-end relationship with each longitudinally extending section being integrally joined to an adjacent longitudinally extending section by a corner on the extremity of one section attached to the preselected position on the other section, with the remainder of such one extremity being free for movement.

It is to be understood that various changes can be made in the arrangement, form, and construction of the sealing gasket disclosed herein and in the several steps of the method described herein without departing from the scope or spirit of the present invention.

Referring to the drawing which discloses an advantageous embodiment of the present invention and a further modification thereof:

FIG. 1 is a plan view of a sheet of gasket material with the sections of the inventive gasket formed thereon, the sections being of a contour conforming with a final endless sealing gasket of preselected rectangular contour;

FIG. 2 discloses the gasket of FIG. 1 in expanded state to provide the rectangular flow-through gasket with continuous sealing capability;

FIG. 3 is a plan view of a sheet of gasket material with the sections of the inventive gasket formed thereon, the sections being of a contour conforming with a final endless sealing gasket of preselected circular shape;

FIG. 4 discloses the gasket of FIG. 3 in expanded state to provide the circular flow-through gasket with continuous sealing capability;

FIG. 5 is a segmental view of a corner portion of the gasket of FIGS. 1 and 2 disclosing how such a gasket can further include a tongue and groove arrangement to effect more thorough continuous sealing; and FIG. 6 discloses the structure of FIG. 5 in assembled position.

Referring to FIGS. 1 and 2 of the drawing, a suitable sheet of gasket material 2, sized in accordance with the sealing gasket contemplated, is utilized. Sheet 2 can be selected from any one of a number of suitably flexible gasket materials known in the art, such as natural or synthetic rubber, or a synthetic composition of plastic.

In making the gasket from sheet 2, there is formed in the sheet a plurality of longitudinally extending sections in parallel, side-by-side relation. These sections include a pair of outer longitudinally extending sections 3 and two sets of intermediate longitudinally extending sections 4 disposed between outer sections 3 in end-to-end relation, the intermediate sections 4 being separated from each other by cut 6. Each set of sections 4 includes two parallel side-by-side longitudinally extending sections 7 and 8, these side-by-side sections being separated from sections 3 by cuts 9 and being separated from each other by cut 10. It is to be noted that in the embodiment disclosed, sections 7 and 8 of the section sets 4 are each a little more than half as much in length than the length of sections 3, so that the difference in length between the sum of the two aligned sections 7 or the sum of the two aligned sections 8 as compared to the length of section 3 is substantially equal to twice the breadth of the sections. In this connection it also is to be noted that all of the sections are of substantially the same breadth so as to provide a uniform endless gasket when fully expanded.

Each of adjacent sections 7 and 8 of each section set 4 are integrally joined to each other at adjacent corners as indicated by reference numeral 11, these joined corners being located at the inner extremities of section sets 4. One outer section 3 is joined at opposite end corners at preselected points on aligned sections 7 and the other outer section 3 is joined at opposite end corners at preselected points on aligned sections 8. It is to be noted that these preselected points of juncture of outer sections 3 to aligned sections 7 and aligned sections 8, respectively, are designated by reference numeral 13, the points being located a distance from the outer extremities of section sets 4 equal to the breadth of one of such equal breadth sections. It also is to be noted that corner portions 14 of blank 2 are removed to permit free movement of sections 7 and 8 relative the sections 3.

In setting up blank 2 of FIG. 1, it only is necessary to pull sections 3 away from each other. This, in turn, causes sections 7 and 8 to pivot about corner junction 11 to form opposed sides 7—8 (FIG. 2). In like manner, sections 7 and 8 pivot about corner junctures 13 to form the right angle corners of the rectangular gasket.

Referring to FIGS. 3 and 4 of the drawing which disclose a gasket of endless curved shape, a suitably shaped blank 30 is utilized to include curved sections 32 formed in at least two longitudinally aligned sets 34 with side-by-side sections 32 of each set 34 being disposed in substantially mirror-image relationship to each other. It is to be noted that in the disclosure of FIG. 3, curved side-by-side sections 32 of each set 34 are joined to each other at the inner corners of the outer extremities of the two pair of adjacent corners, the junctured corners being indicated by reference numerals 35. It further is to be noted that the aligned sets 32 of longitudinally aligned sets 34 are joined to each other at the outer adjacent corners, the junctured corners being indicated by reference numerals 36. Thus, the juncture corners 35 and 36 are alternately positioned adjacent the inner and outer perimeters of the curved gasket when the gasket is extended as disclosed in FIG. 4.

To insure an effective continuous sealing of the gaskets such as disclosed in FIGS. 1 to 4 of the drawing, it is further possible to provide at the junctured extremities of the sections a dovetail arrangement including tongue 37 and groove 38, which, when the longitudinally extending sections are pivoted about the corners, engage to further insure proper sealing.

I claim:

1. An endless, collapsible, planar sealing gasket comprising in its setup state a plurality of longitudinally extending sections disposed in end-to-end relationship, each longitudinally extending section being integrally and continuously joined to an adjacent longitudinally extending section by a corner portion only of the end of said each section, the remainder of such one end being separately free for movement whereby the gasket may be collapsed.

2. The gasket of claim 1, said gasket being rectangular in shape to include a first set of longitudinally extending sections forming one pair of opposed sides of the rectangle and second and third sets of intermediate longitudinally extending sections having at least two sections to a set forming the other pair of opposed sides, the longitudinally extending sections of said first set each being integrally and continuously joined adjacent its opposite ends to said sections of said second and third sets, respectively, so that the corners of one section are integrally connected to the adjacent sections at a position removed from the ends of said adjacent section by a distance substantially equal to the breadth of said sections thereby forming the right angle corners of said rectangular gaskets, the longitudinally extending sections of said second and third sets being connected to each other at one of the two adjacent corners of adjacent ends, respectively, to form said other pair of opposed sides in straight-line fashion.

3. The gasket of claim 1, said gasket being of integral and continuous endless curved shape to include end-to-end curved segments with adjacent segments being joined to each other at one of the two adjacent corners of adjacent extremities, the joined corners being alternatively positioned adjacent the inner and outer perimeters of said curved gasket.